(12) United States Patent
Sliskovic et al.

(10) Patent No.: US 7,696,939 B2
(45) Date of Patent: Apr. 13, 2010

(54) ROOF ANTENNA ARRAY FOR PHASE DIVERSITY SYSTEM

(75) Inventors: Maja Sliskovic, Ettlingen (DE); Philipp Schmauderer, Höfen (DE); Christoph Benz, Ohlsbach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 12/043,553

(22) Filed: Mar. 6, 2008

(65) Prior Publication Data
US 2008/0246672 A1 Oct. 9, 2008

(30) Foreign Application Priority Data
Mar. 8, 2007 (EP) .................. 07004814

(51) Int. Cl.
*H01Q 1/32* (2006.01)
(52) U.S. Cl. .................. 343/711; 343/713; 343/853
(58) Field of Classification Search ............. 343/711, 343/713, 850, 853
See application file for complete search history.

(56) References Cited

U.S. PATENT DOCUMENTS

| 4,535,336 | A | * | 8/1985 | Shaver ................. 343/713 |
| 5,457,467 | A | | 10/1995 | Schenkyr |
| 7,081,810 | B2 | * | 7/2006 | Henderson et al. ........ 340/435 |
| 7,205,946 | B2 | * | 4/2007 | Sablatzky et al. ......... 343/712 |
| 2007/0013594 | A1 | | 1/2007 | Yegin |
| 2007/0129020 | A1 | * | 6/2007 | Anton-Becker ........... 455/78 |
| 2007/0182626 | A1 | * | 8/2007 | Samavati et al. ...... 342/357.06 |

FOREIGN PATENT DOCUMENTS

| DE | 38 02 130 A1 | 8/1989 |
| EP | 0 987 789 A1 | 3/2000 |
| FR | 1 138 609 A | 6/1957 |
| JP | 07 263928 A | 10/1995 |

* cited by examiner

*Primary Examiner*—Hoang V Nguyen

(57) ABSTRACT

A diversity antenna system may receive transmitted signals. The diversity antenna system includes multiple phase diversity antenna elements. One or more of the phase diversity antenna elements are positioned substantially parallel to an external surface of a vehicle. The phase diversity antenna elements are adapted to receive phase diversity signals.

26 Claims, 7 Drawing Sheets

ROOF ANTENNA ARRAY FOR PHASE DIVERSITY SYSTEM

BACKGROUND OF THE INVENTION

1. Priority Claim

This application claims the benefit of priority from European Patent Application No. 07004814.5, filed Mar. 8, 2007, which is incorporated by reference.

2. Technical Field

This application relates to diversity antenna systems and, more particularly, to diversity antenna systems for use on vehicles.

3. Related Art

Diversity antenna systems utilize two or more antenna elements to receive signals. Diversity antenna systems may reduce multi-path interference, improve fringe area reception, and enhance sound quality. Vehicles may incorporate diversity antenna technology to improve reception. Antenna placement is an important consideration in vehicle design as the configuration of the multiple antenna elements may affect reception quality.

SUMMARY

A diversity antenna system may receive transmitted signals. The diversity antenna system includes multiple phase diversity antenna elements. One or more of the phase diversity antenna elements are positioned substantially parallel to an external surface of a vehicle. The phase diversity antenna elements are adapted to receive phase diversity signals. The signals are processed such that the resulting signal is not necessarily a coherent sum of multiple incoming signals.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
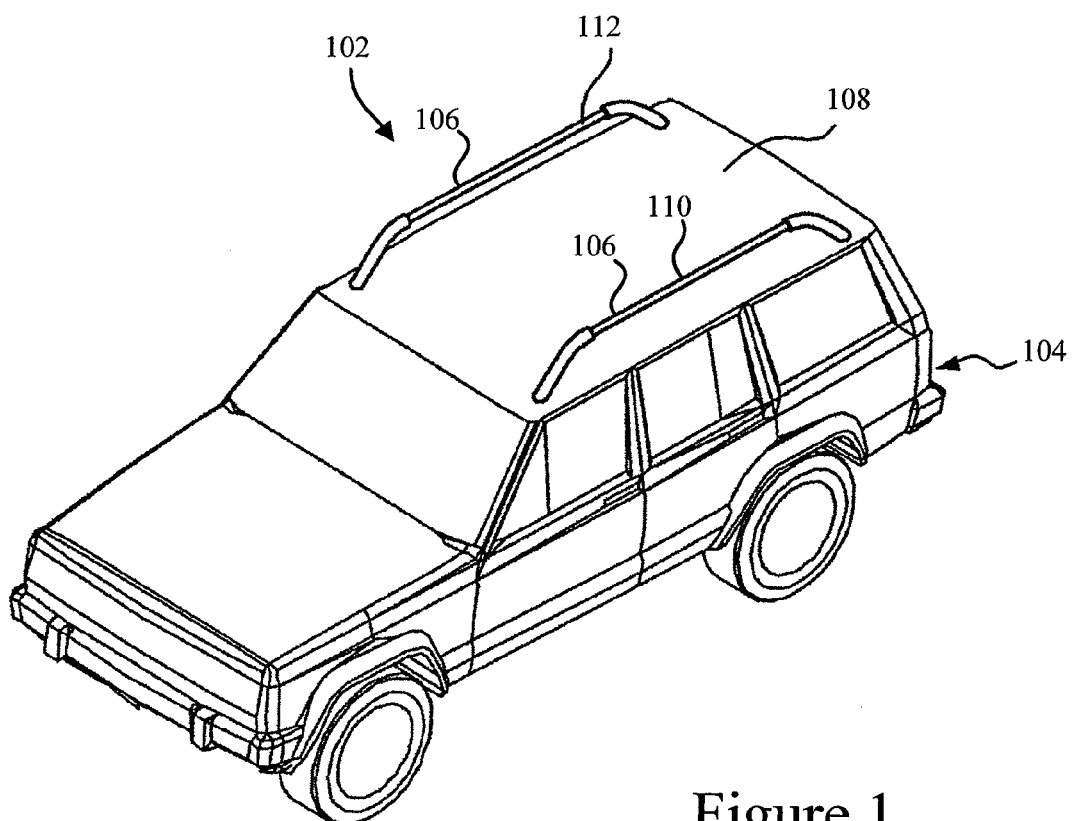
FIG. 1 illustrates a diversity antenna system on a vehicle.

FIG. 1 illustrates a mobile diversity antenna system 102. The mobile diversity antenna system 102 may be fixed to or incorporated into a vehicle 104. The vehicle 104 may have a roof 108 and roof rails 110 and 112. The roof rails 110 and 112 may be located a predetermined distance apart. In some systems, the roof rails 110 and 112 may be substantially parallel to each other and/or substantially parallel to an exterior surface of the vehicle 104, such as the roof 108. The vehicle 104 may be a sports utility vehicle ("SUV"), off-road vehicle, hatchback, van, car, truck, estate car, station wagon, or other vehicle.

The diversity antenna system 102 includes multiple antenna elements 106. The antenna elements 106 may be phase diversity antenna elements. The roof rails 110 and 112 may be positioned above an uppermost surface of the vehicle 104. The uppermost surface may comprise a ground plane. One or more antenna elements 106 may be substantially parallel to a surface of the roof 108 on top of the vehicle 104. The antenna elements 106 may run generally between the front of the vehicle 104 and the back of the vehicle 104. One of the antenna elements 106 may be positioned along a line passing across a left side of the roof 108 between the front of the vehicle 104 to the back of the vehicle 104. A second antenna element 106 may be positioned along a line passing across a right side of the roof 108 from the front of the vehicle 104 to the back of the vehicle 104. In some systems, each of the antenna elements 106 may be positioned in a line or plane that is substantially parallel to a side of the vehicle 104.

In FIG. 1, the diversity antenna system 102 includes two antenna elements 106. The two antenna elements 106 may be separated by a predetermined distance. The separation of the two antenna elements 106 may be about half a wavelength, which may be about half an average radio wavelength within a band from about 87.5 to about 108.9 MHz. The antenna elements 106 may be separated by a larger distance than when both antenna elements are integrated in the rear window of a vehicle. In some systems, the coupling between the two antenna elements 106 may also be less than when both antenna elements are integrated in the rear window of a vehicle.

The antenna elements 106 may be substantially parallel to each other. In some systems, at least one of the antenna elements 106 may be attached to one of the roof rails 110 and 112 of the vehicle 104. One antenna element 106 may be attached to the left roof rail 110 and/or another antenna element 106 may be attached to the right roof rail 112. The antenna elements 106 maybe fastened by an adhesive. Alternatively, the antenna elements 106 may be fastened to the roof rails 110 and 112 by mechanical elements, such as straps, bolts, or screws, or other attachment devices.

In other systems, one or more of the antenna elements 106 may be integrated into the roof rails 110 and 112. One antenna element 106 may be integrated into the left roof rail 110 and/or another antenna element 106 may be integrated into the right roof rail 112. An antenna element 106 may be integrated into one of the roof rails 110 and 112 by forming an area of antenna material in or on the roof rail. The roof rail may contain an inner cavity to house the antenna element. In some systems, the antenna elements 106 may be unitary parts of the roof rails 110 and 112. In other systems, one or more portions of the roof rails 110 and 112 may be adapted to operate as antenna elements. The roof rails 110 and 112 themselves may act as antennas. This may be achieved by forming the roof rails 110 and 112 from an appropriate antenna material, such as aluminum.

The antenna element 106 may run the length of a roof rail or may only run a portion of the length of a roof rail. The antenna elements 106 may have a length of about half a wavelength of an audio signal, such as about half an average wavelength of a radio signal within a band from about 87.5 to about 108.9 MHz. In some systems, the antenna elements 106 may be dipoles. In other systems, the antenna elements 106 may be passive antennas. In still other systems, the antenna elements 106 may be active antennas. The antenna elements 106 may be driven by an applied source feed.

In some systems, the antenna element 106 may be parallel or nearly parallel to the exterior surface of the roof 108. In other systems, a portion of the antenna element 106 may be parallel or nearly parallel to the exterior surface of the roof 108. Multiple antenna elements 106 may be positioned to be substantially parallel to the surface of the roof 108 of the vehicle 104. Alternatively, one antenna element 106 may be positioned to be substantially parallel to a surface of the roof 108 of the vehicle 104 while another antenna element 106 is located in another position on the vehicle, such as integrated within the rear window of the vehicle 104.

The antenna elements 106 may receive coherent and incoherent signals. In some systems, the antenna elements 106 may receive frequency modulated signals. The antenna elements 106 may receive signals within a range of about 65.9 MHz to about 108 MHz. In other systems, the antenna elements 106 may control phase properties and may receive signals within other frequency bands. The diversity antenna system 102 may improve reception in the vehicle 104.

Figure 2:
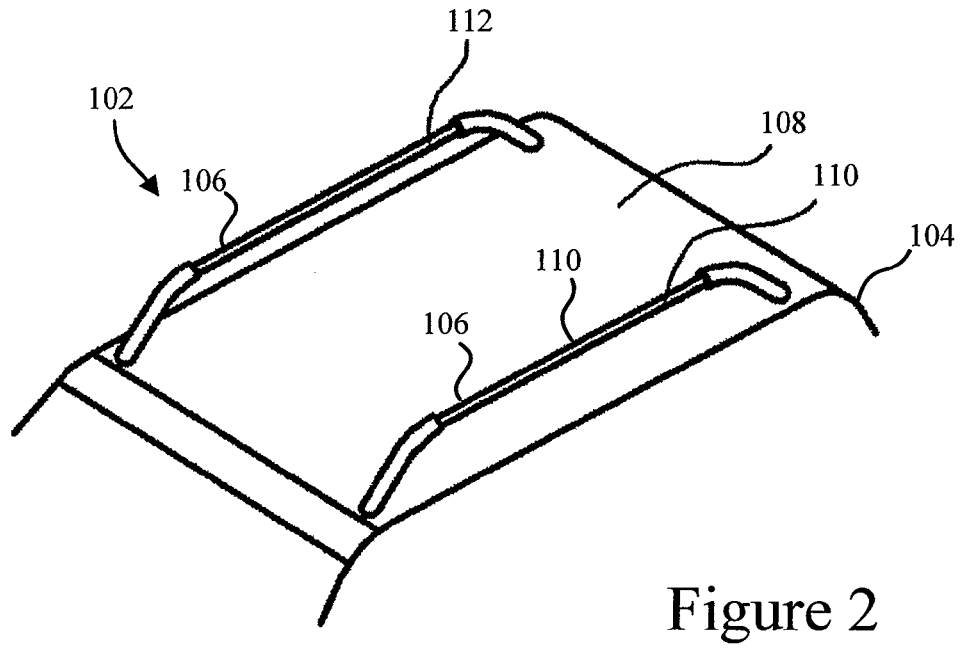
FIG. 2 illustrates a first set of roof rails comprising one or more antenna elements of a diversity antenna system.

The roof rails 110 and 112 in FIG. 2 are elevated from an external surface of the roof 108 of the vehicle 104. The roof rails 110 and 112 may operate as antenna elements or may support separate antenna elements. A curved portion of the roof rails 110 and 112 may connect the elevated portion of the roof rails 110 and 112 to the surface of the roof 108. In FIG. 2, air may pass between a portion of the rails 110 and 112 and the roof 108 of the vehicle 104.

Figure 3:
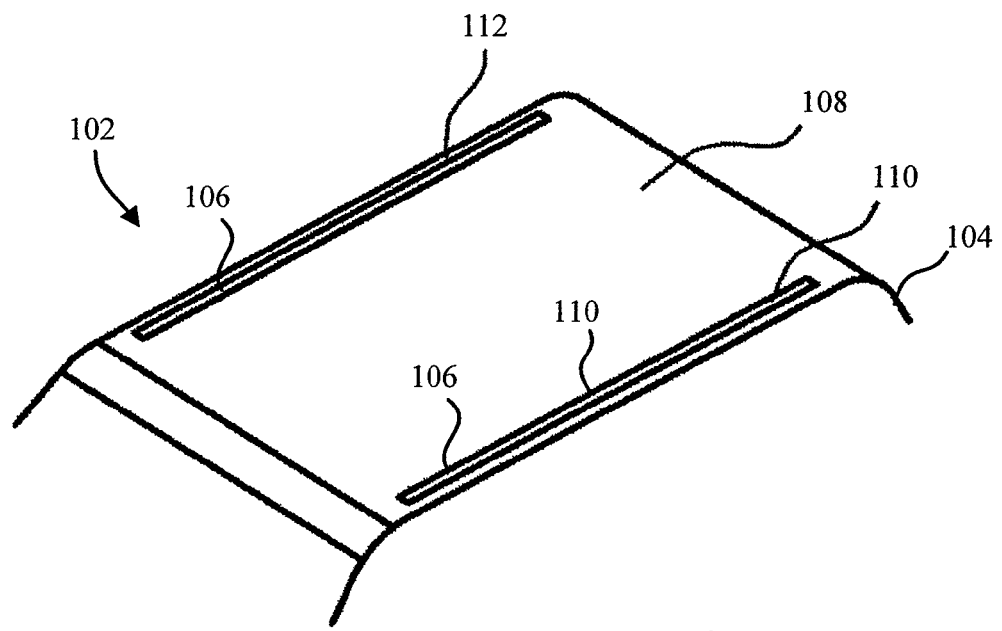
FIG. 3 illustrates a second set of roof rails comprising one or more antenna elements of a diversity antenna system.

The roof rails 110 and 112 in FIG. 3 are located on or within a plane coincident or below the external surface of the roof 108. The roof rails 110 and 112 may operate as antenna elements or may support separate antenna elements. In some systems, the roof rails 110 and 112 are attached to the roof 108 of the vehicle 104. An insulation layer may be disposed between the antenna element 106 and the roof 108.

Figure 4:
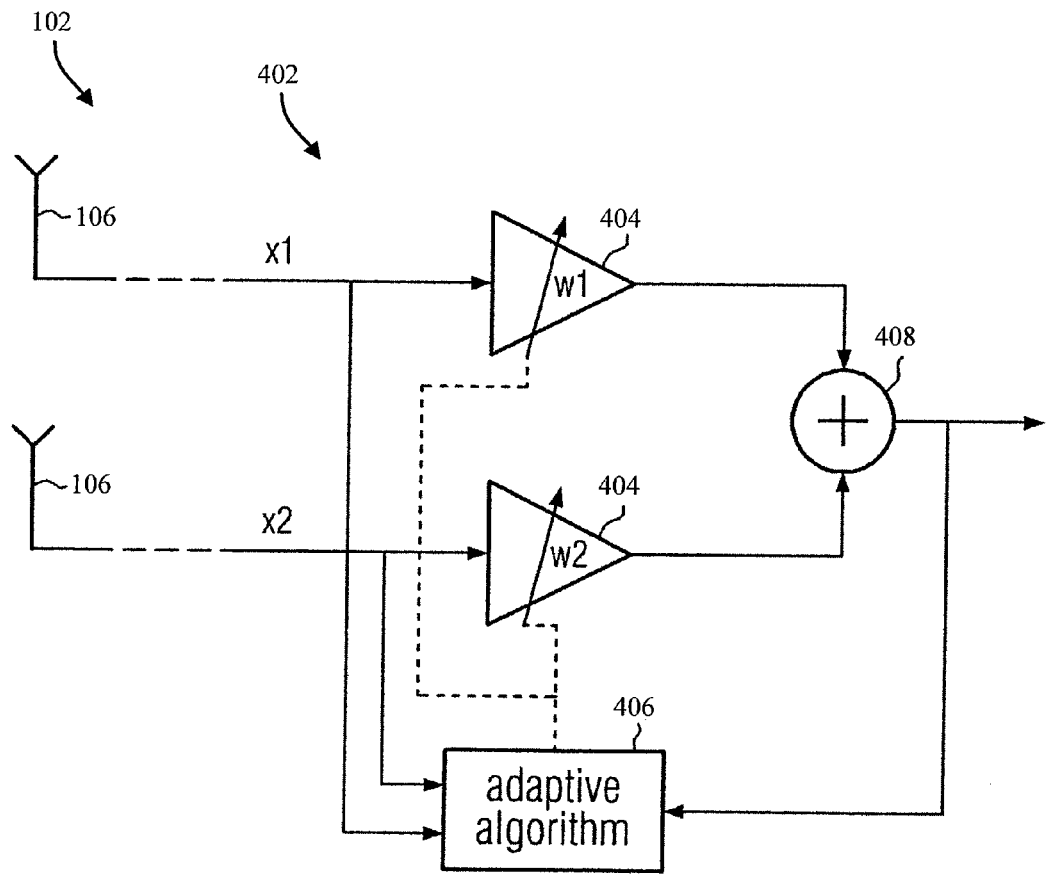
FIG. 4 illustrates a first diversity antenna system with two antenna elements.
Figure 5:
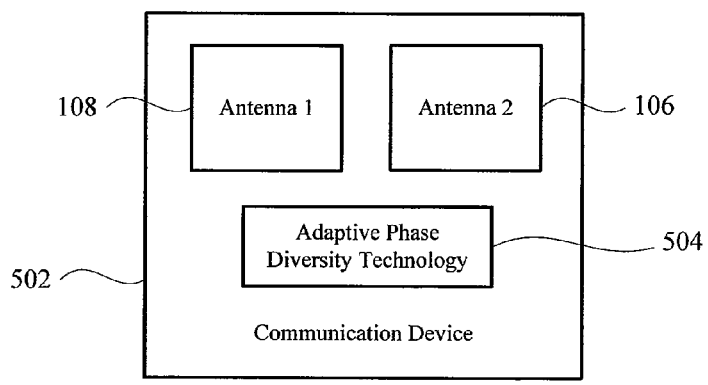
FIG. 5 illustrates a communication device having adaptive phase diversity technology.

In FIG. 4, the diversity antenna system 102 comprises two antenna elements 106. The antenna elements 106 may receive phase diversity signals. The diversity antenna system 102 may comprise a mobile phase diversity antenna array. The diversity antenna system 102 may be an FM phase diversity system. The FM phase diversity system may receive frequency modulated signals for a vehicle. The antenna elements 106 may receive phase diversity signals and may provide the signals to a communication device 502 that comprises adaptive phase diversity technology 504, as shown in FIG. 5. In some systems, the communication device 502 may be located within a vehicle. In other systems, the communication device 502 is part of a vehicle.

In phase diversity systems, the fading of signals received at different antenna elements may be independent of each other. The level of fading received at one of the antenna elements 106 may be different than the level of fading received at the other of the antenna elements 106. In systems in which the sum of the signal comprises a vector sum of M signals, the interfering terms may comprise M−1 terms. The incident angles may all be independent such that the magnitude of the signals of each element may be determined in a random fashion.

When the phase of the received diversity signal changes due to the multipath environment, a combination of the diversity signals may have improved characteristics. A phase diversity system may combine baseband signals or intermediate frequency ("IF") signals. In FIG. 4, the phase diversity system receives signals x1 and x2 from multiple antenna elements 106. The system may adaptively change one or more aspects of one of the signals x1 and x2 or both of the signals x1 and x2. In some systems, both phase and amplitude of the signals x1 and x2 may be adaptively changed. In other systems, only the phases of the signals x1 and x2 may be adaptively changed.

Phase rotation and amplitude amplification/attenuation of signals x1 and x2 may be performed either in the analog domain or in the digital domain. One possible implementation of the phase diversity system multiplies the signals x1 and x2 with complex weighting factors w1 and w2 respectively, as follows:

$$w1 = a1 + j*b1, \text{ and} \qquad \text{(equation 1)}$$

$$w2 = a2 + j*b2. \qquad \text{(equation 2)}$$

The received signals may be passed to a phase diversity unit 402. One or more signal processors or filters may condition the signals before the signals are received by the phase diversity unit 402. The phase diversity unit 402 may comprise one or more weighting components 404, an adaptive controller 406, and an adder 408.

The signals x1 and x2 may be weighted by the weighting components 404. The weighting components 404 may adjust one or more aspects of the signals x1 and x2, such as the phase and/or amplitude of the signals x1 and x2. The output of each of the weighting components 404 is passed to the adder 408 where the outputs are combined. The weighting factors w1 and w2 applied to the signals x1 and x2 at the weighting components 404 may be determined by the adaptive controller 406. The adaptive controller 406 processes the signals x1 and x2 and feedback from the adder 408 to set the weighting factors w1 and w2.

Figure 6:
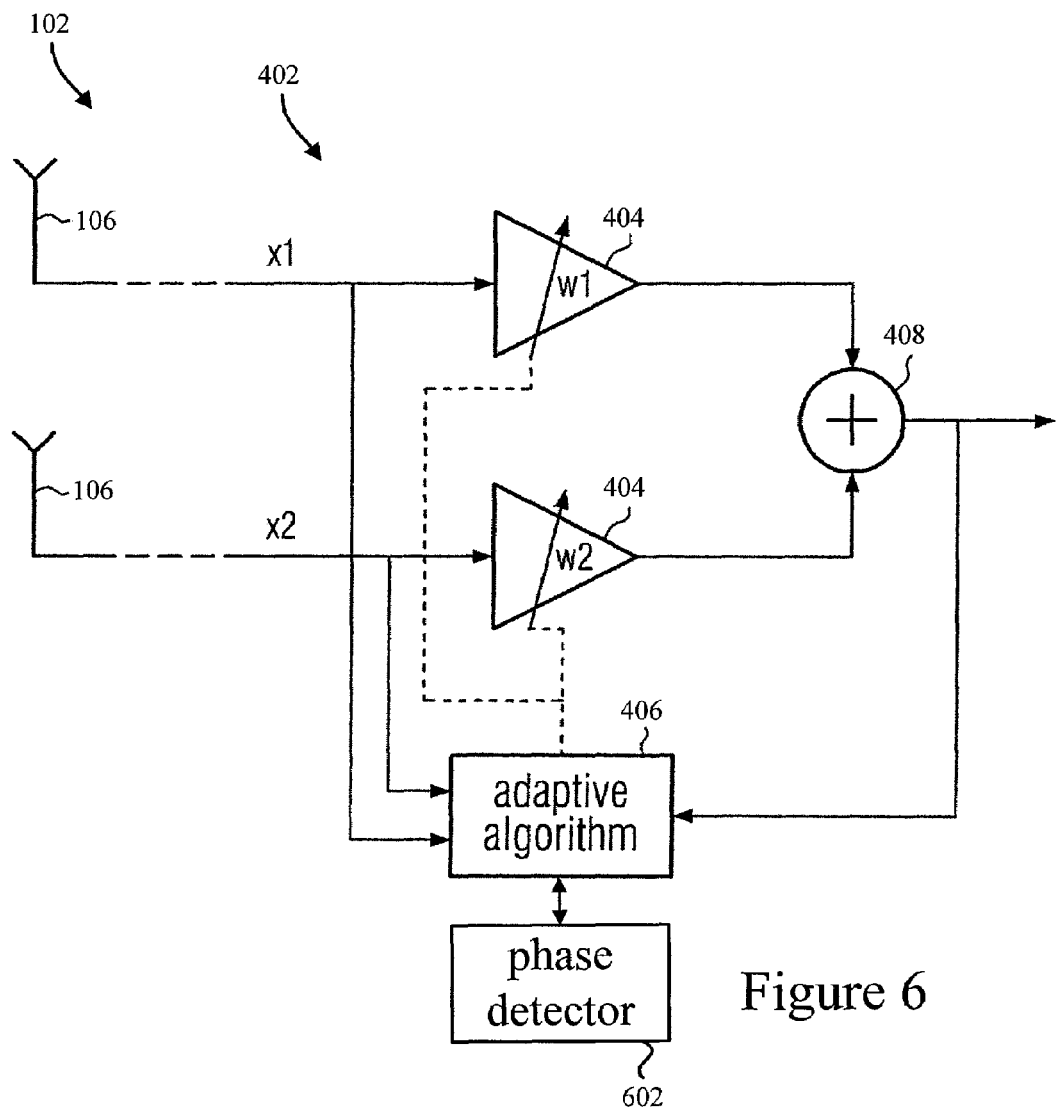
FIG. 6 illustrates a second diversity antenna system with two antenna elements.

FIG. 6 illustrates an alternative phase diversity antenna system that includes a phase detector 602. In some systems, the phase detector 602 may be separate from the adaptive controller 406. In other systems, the phase detector 602 is part of the adaptive controller 406. The phase detector 602 may determine the phase of the received signals x1 and x2. The phase detector 602 may pass phase information to the adaptive controller 406. The adaptive controller 406 may process the phase information to align or modify the phase of the signals x1 and x2. If the adaptive controller 406 detects a phase difference, the adaptive controller 406 may set a non-linear weighting factor for one or more of the weighting components 404. The non-linear weighting factor may align the phases of each of the signals output from the weighting components 404. Specifically, the phase diversity unit 402 may change a phase of one of the signals x1 and x2 and output a signal based on a combination of the phase-shifted signal and the other signal. Alternatively, the phase diversity unit 402 may change the phase of both signals x1 and x2 before they are combined at the adder 408.

Figure 7:
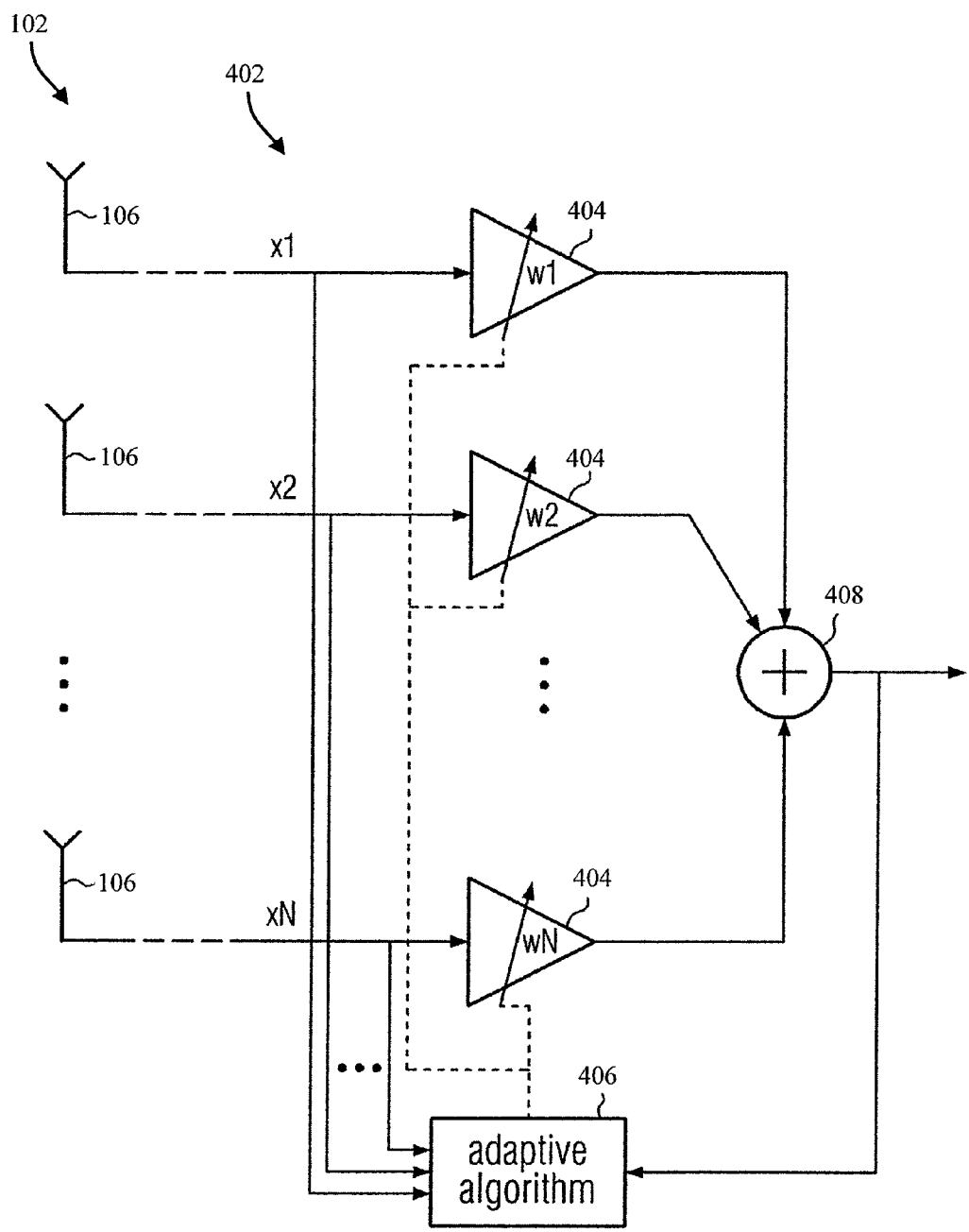
FIG. 7 illustrates a first diversity antenna system with more than two antenna elements.

In FIG. 7, the diversity antenna system 102 comprises more than two antenna elements 106. The received signals x1, x2, through xN may be weighted in a weighting logic or circuit 404 before being combined by adder 408. The weighting factors w1, w2, through wN may be programmed by the adaptive controller 406. The adaptive controller 406 may determine the weighting factors w1, w2, through wN based on feedback from adder 408 and the received signals x1, x2, through xN.

Figure 8:
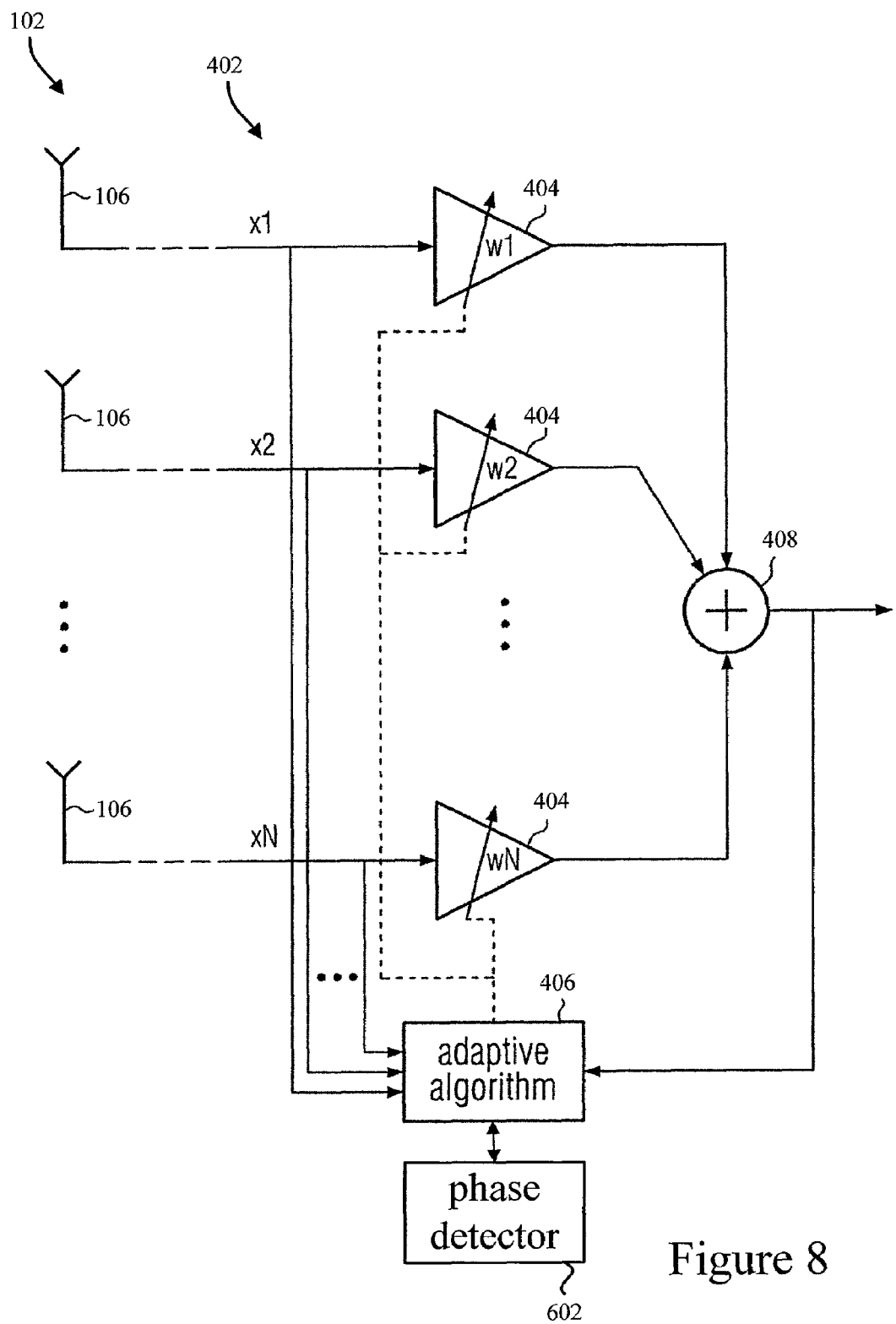
FIG. 8 illustrates a second diversity antenna system with more than two antenna elements.

In FIG. 8, the diversity antenna system 102 comprises more than two antenna elements 106 and a phase detector 602. The phase detector 602 may determine the phase of the received signals x1, x2, through xN. The adaptive controller 406 may then use phase information from the phase detector 602 to align the phase of the signals x1, x2, through xN.

Figure 9:
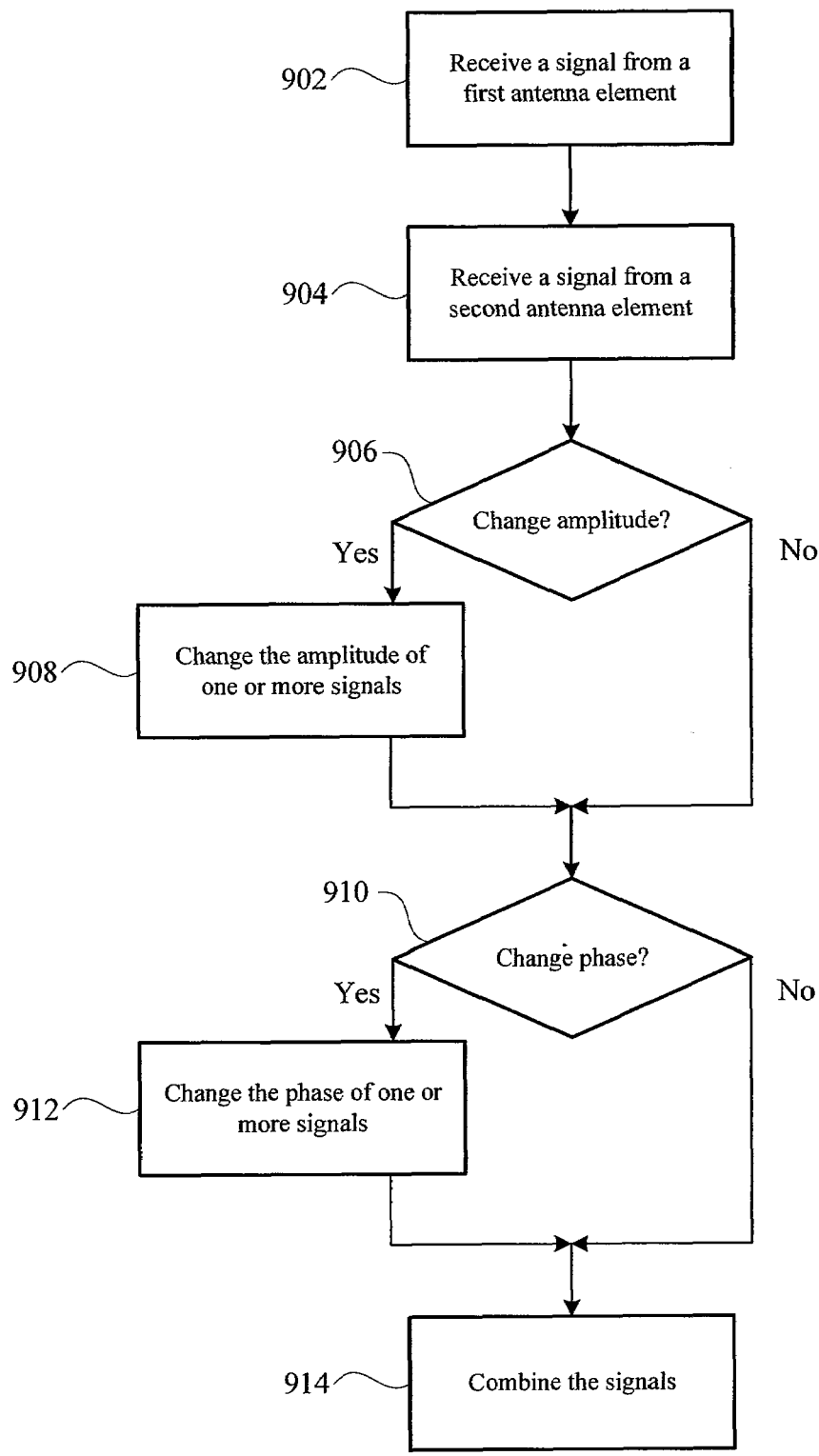
FIG. 9 illustrates phase diversity processing.

FIG. 9 illustrates phase diversity processing. At 902, a signal is received from a first antenna element. At 904, a signal is received from a second antenna element. Additional signals may also be received in systems with more than two antenna elements. At 906, the system determines whether to change the amplitude of one or more of the received signals. In some systems, the amplitude of a signal may be adjusted to substantially match the amplitude of another signal. In other systems, the amplitude of a signal may be adjusted to reach a predetermined threshold. If the amplitude of a signal is to be changed, then the signal is processed to change the amplitude of the signal at 908. The amplitude of more than one of the received signals may be adjusted. At 910, the system determines whether to change the phase of a signal. In some systems, the phase of a signal may be adjusted to substantially match the phase of another signal. If the phase of a signal is to be changed, then the signal is processed at 912. The phase of more than one of the received signals may be shifted. At 914, the signals are combined.

The diversity antenna system may produce a signal that may be substantially free of interference due to the structure of the vehicle. The system may be unobtrusive, may avoid changing the physical appearance of the vehicle, and may improve performance. In some systems, the phase diversity reception antennas increase the surface area of the antenna configuration. In other systems, the integration of the phase diversity reception antennas into existing vehicle elements may reduce antenna wind noise.

Each of the processes described may be encoded in a computer readable medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logic. Logic or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM," a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

Although selected aspects, features, or components of the implementations are described as being stored in memories, all or part of the systems, including processes and/or instructions for performing processes, consistent with the system may be stored on, distributed across, or read from other machine-readable media, for example, secondary storage devices such as hard disks, floppy disks, and CD-ROMs; a signal received from a network; or other forms of ROM or RAM resident to a processor or a controller.

Specific components of a system may include additional or different components. A controller may be implemented as a microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions), databases, and other data structures may be separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A diversity antenna system for use on a vehicle, the diversity antenna system comprising:
   at least two phase diversity antenna elements, where at least one phase diversity antenna element is substantially parallel to a roof surface of the vehicle; and
   where the at least two phase diversity antenna elements are adapted to receive phase diversity signals that are processed by adaptive phase diversity technology configured to adaptively change phases of the phase diversity signals or phases and amplitudes of the phase diversity signals.

2. The system of claim 1, where the at least one phase diversity antenna element is attached to a roof rail of the vehicle.

3. The system of claim 1, where the at least one phase diversity antenna element is a unitary part of a roof rail of the vehicle.

4. The system of claim 1, where at least one roof rail is adapted to operate as the at least one phase diversity antenna element.

5. The system of claim 1, where the at least two phase diversity antenna elements are adapted to receive frequency modulated signals.

6. The system of claim 1, where the at least two phase diversity antenna elements are adapted to receive signals within a frequency range from about 65.9 MHz to about 108 Mhz.

7. The system of claim 1, where the at least two phase diversity antenna elements have a length of about half a wavelength of a received signal.

8. The system of claim 1, where the at least two phase diversity antenna elements comprise dipoles.

9. The system of claim 1, where the at least two phase diversity antenna elements comprise active antenna.

10. A vehicle roof rail system, comprising:
   a first roof rail comprising a first phase diversity antenna element;
   a second roof rail comprising a second phase diversity antenna element; and
   where the first and second phase diversity antenna elements are adapted to receive phase diversity signals and are positioned above an uppermost surface of a vehicle comprising a ground plane; and
   where the phase diversity signals are processed by adaptive phase diversity technology configured to adaptively change phases of the phase diversity signals or phases and amplitudes of the phase diversity signals.

11. A system, comprising:
   a first phase diversity antenna element;
   a second phase diversity antenna element;
   a phase diversity unit adapted to receive a first signal from the first phase diversity antenna element and a second signal from the second phase diversity antenna element;
   where at least one of the phase diversity antenna elements is disposed substantially parallel to an external roof surface of a vehicle; and
   where the phase diversity unit is adapted to change a phase of the first signal and output a combination of the first signal and the second signal.

12. The system of claim 11, where the first and second phase diversity antenna elements are adapted to receive phase diversity signals.

13. The system of claim 11, where the first phase diversity antenna element is spaced apart from the second phase diversity antenna element by about half a wavelength of a received signal.

14. The system of claim 11, where the first phase diversity antenna element or the second phase diversity antenna element has a length of about half a wavelength of a received signal.

15. The system of claim 11, where a roof rail of the vehicle comprises the at least one phase diversity antenna element.

16. The system of claim 11, where the at least one phase diversity antenna element is a unitary part of a roof rail of the vehicle.

17. The system of claim 11, where the phase diversity unit comprises an adder adapted to combine the first signal and the second signal.

18. The system of claim 17, where the adder is configured to combine a weighted version of the first signal and a weighted version of the second signal.

19. The system of claim 17, where the phase diversity unit comprises a weighting component adapted to adjust an aspect of the first signal based on analysis of the first signal, the second signal, or an output of the adder.

20. The system of claim 19, where the weighting component is adapted to substantially align a phase of the first signal with a phase of the second signal.

21. The system of claim 20, where the adder is adapted to combine a phase-shifted version of the first signal with the second signal.

22. The system of claim 17, where the phase diversity unit comprises a weighting component adapted to adjust at least one aspect of the first signal before sending the first signal to the adder, and where the phase diversity unit comprises an adaptive phase diversity unit that receives an output of the adder and sets a weighting factor for the weighting component based on the output of the adder.

23. The system of claim 11, where the phase diversity unit comprises an adder adapted to combine the first signal and the second signal, where a frequency range of the first signal overlaps with a frequency range of the second signal.

24. A system, comprising:
   a first phase diversity antenna element;
   a second phase diversity antenna element;
   a phase diversity unit adapted to receive a first signal from the first phase diversity antenna element and a second signal from the second phase diversity antenna element;
   where at least one of the phase diversity antenna elements is disposed substantially parallel to an external roof surface of a vehicle;
   where the phase diversity unit is adapted to change a phase of the first signal and output a combination of the first signal and the second signal;
   where the phase diversity unit comprises an adder adapted to combine the first signal and the second signal;
   where the phase diversity unit comprises a first weighting component adapted to adjust an aspect of the first signal based on analysis of the first signal, the second signal, or an output of the adder; and
   where the phase diversity unit comprises a second weighting circuit adapted to adjust an aspect of the second signal based on analysis of the first signal, the second signal, or the output of the adder.

25. The system of claim 24, where the phase diversity unit comprises an adaptive controller that receives the first signal, the second signal, and the output from the adder; and
   where the adaptive controller is adapted to set one or more weighting factors for the first and second weighting components based on analysis of the first signal, the second signal, or the output of the adder.

26. A system, comprising:
   a first phase diversity antenna element;
   a second phase diversity antenna element;
   a phase diversity unit adapted to receive a first signal from the first phase diversity antenna element and a second signal from the second phase diversity antenna element;
   where at least one of the phase diversity antenna elements is disposed substantially parallel to an external roof surface of a vehicle; and
   where the phase diversity unit is adapted to substantially align a phase of the first signal with a phase of the second signal and output a combination of the first signal and the second signal.

* * * * *